2,950,984

MAKING CADMIUM RED PIGMENTS

Frank O. Rummery, Reuben Roseman, and James M. Gilbert, Baltimore, Md., assignors to The Glidden Company, Cleveland, Ohio, a corporation of Ohio No Drawing. Filed July 26, 1957, Ser. No. 674,287

9 Claims. (Cl. 106—301)

This invention provides an improved process for preparing cadmium red pigments. The invention provides, more specifically, an improved process for preparing mercury-cadmium sulfide pigments and has to do with treating agents for improving the physical and chemical characteristics of said pigments.

In copending application Serial No. 674,315, filed July 26, 1957, there is described a method for preparing a series of mercury-cadmium sulfide red pigments. Briefly, in the preferred embodiment of that invention, mercury-containing cadmium red pigments are prepared by adding a solution of mercury in nitric acid to an alkali or alkaline earth sulfide solution and then adding the so-prepared mercury-containing alkali or alkaline earth sulfide solution to a cadmium salt solution to obtain a co-precipitate of mercury sulfide and cadmium sulfide. The precipitated product is then filtered and washed to remove undesired soluble salts, dried, and thereafter favorably calcined to produce the pigment product.

In preparing mercury-cadmium sulfide pigments of the lighter shades in accordance with the teachings of the above-identified copending application, we have found that the raw pigment(s), or greencake, prepared by the procedure described therein, exhibit certain undesirable characteristics, specifically physical and chemical instability. Thus, we have found that upon prolonged washing of the greencake to remove or extract soluble salts, the precipitate is subject to peptization with consequent impairment in the quality of product and physical loss of material. Furthermore, the untreated raw pigment is susceptible to oxidation, either upon subsequent drying of the washed raw pigment at drier temperatures, which are ordinarily in the order of from 75° to 150° C., or upon storage at room temperature prior to calcination.

It should be understood that by "raw pigment" or "greencake" we mean any form of the mercury-cadmium sulfide precipitate, washed or unwashed, wet or dry, which has not been calcined.

It is an object of our invention to provide a novel and improved process for preparing mercury-containing, cadmium red pigments.

Another object of our invention is to provide a solution to the objectionable features encountered heretofore in preparing pigments of the lighter hues in accordance with the above-described procedure.

A further object of our invention is a process for improving the storageability of a raw pigment comprising mercury-cadmium sulfide.

A still further object of our invention is to provide an improved process for preparing mercury sulfide-cadmium sulfide red pigments of improved quality, which process is economical and simple.

Other objects will be realized by those skilled in the art from the description of our invention which follows.

In conformity with the foregoing objects, we have discovered that if a raw pigment composition comprising mercury and cadmium sulfide is treated with a minor amount by weight of hydrated silica and/or alumina, there is obtained, in enhanced yield, a final pigment product of improved physical and chemical characteristics.

Although our invention covers the use of various compounds of silicon and aluminum as treating agents, such as aluminum sulfate or chloride and alkali metal silicates and aluminates, such as those of potassium and sodium, reference will be made hereinafter to sodium silicate and sodium aluminate, since such sodium compositions are well known and are commercially available. The particular ratio of $Na_2O$ to $SiO_2$ or $Al_2O_3$ of the silicates and aluminates applicable herein varies widely. However, a weight ratio of $Na_2O:SiO_2$ of 1:3 for the sodium silicate, and a weight ratio of $Na_2O:Al_2O_3$ of 2:3 for the sodium aluminate have been found to be very satisfactory.

In our preferred method of carrying out our process, we prepare a strike slurry by adding a mercury-containing nitic acid solution to an alkali or alkaline earth sulfide, followed by adding the so-prepared solution of mercury-alkali sulfide or mercury-alkaline earth sulfide to a solution of cadmium sulfate. The resulting precipitate, which comprises mercury sulfide and cadmium sulfide, is then treated with a minor amount, sufficient to inhibit peptization and/or oxidation of the product in subsequent process or treatment steps, of a mixture of sodium silicate and sodium aluminate. If desired, however, either sodium silicate or sodium aluminate can be employed alone, but we prefer to employ a mixture of the two, as will be illustrated in our specific examples. We do not consider it desirable or necessary here to advance any explanation regarding the chemical or physical role played by the sodium silicate or aluminate in inhibiting peptization and oxidation of the raw pigment product, even though our invention is based on this discovery.

In one modification of our invention, we can add the sodium silicate and aluminate to a mercury-containing alkali metal sulfide solution and then make a strike by adding the resultant mixture to a cadmium sulfate solution, followed by washing, drying and calcining to produce a high-quality red pigment. We have found that the treating agents of our invention are even effective in reconditioning washed greencake which has begun to peptize. Thus, it should be apparent that the addition of the treatment agents to the raw pigment composition can be made (a) before precipitation of the raw pigment, (b) to the strike slurry and (c) to the partially washed raw pigment mass. In the last instance, in order to avoid loss of quality and quantity of material, the sodium silicate and aluminate should be added to the greencake prior to substantial peptization thereof.

The amounts by weight of sodium silicate and aluminate expressed as $SiO_2$ and $Al_2O_3$, individually or in admixture, that can be employed to give beneficial results range from 0.05 to 3% by weight of the calcined pigment. Lower amounts can be employed but are not as effective, while higher amounts, in addition to stabilizing the composition, are of advantage in functioning as extenders.

Our invention contemplates the addition of compounds of silicon and aluminum to a mercury-containing alkali metal sulfide solution or to a cadmium sulfate solution or to a raw pigment composition comprising mercury-cadmium sulfide, prior to calcination, under conditions whereby hydrated silica and alumina are precipitated in the pigment composition. Thus, the silicon and aluminum compounds, under the conditions employed, form a small or minor amount of hydrated silica or hydrated alumina in the pigment composition.

Reference is now made to the specific examples which demonstrate the problems with which we are dealing, as well as the treatments in accordance with our invention. Even so, we are not to be limited to the specific values or procedures described since our examples are by way of illustration only.

EXAMPLE 1

This example is offered to demonstrate the problems of peptization and of pigment quality deficiency resulting from the preparation of a mercury-cadmium sulfide pigment without the benefit of the novel treatment of the process of our invention.

To 77 gallons of nitric acid containing 4.12 lbs. of $HNO_3$ per gallon, there were added 132 lbs. of elemental mercury. After the dissolution of the mercury was complete, 38 gallons of water were added to the solution. The quantity of nitric acid used represented a weight ratio of $HNO_3$:Hg of 2.4:1.00. The solution containing the dissolved mercury was then added slowly, and with good agitation, to 637 gallons of sodium sulfide solution of a concentration of 0.357 lb. of sulfide ion per gallon. The resulting mercury-containing sodium sulfide solution was then added slowly and with good agitation to 570 gallons of cadmium sulfate solution of a concentration of 1.17 lbs. Cd per gallon. The resulting slurry was thereafter neutralized with 29 gallons of sodium hydroxide solution of a concentration of 1.0 lb. NaOH per gallon.

In the above strike, the quantity of mercury, in relationship to the cadmium employed, represented a weight ratio of Hg:Cd of 0.198:1.00, which relationship will produce a light red pigment.

We have observed that when washing the raw pigment prepared as above described, as the washing time is extended the precipitate is adversely affected, becoming partially peptized, as evidenced by the appearance of a cloudy filtrate. This results in loss of raw pigment and in degradation of final pigment quality. Furthermore, raw pigments so prepared are additionally subject to quality degradation as the result of oxidation upon prolonged storage prior to calcination.

Part A

Employing a wash procedure which could be conducted on a plant scale only by the use of specially designed high-cost equipment (requiring a very thin cake), a sample of 2½ pounds of the above strike slurry was filtered and washed quickly (½ hour), although effectively, while avoiding appreciable peptization.

Part B

In contrast to Part A, a sample of the above strike slurry, weighing 2½ lbs., was filtered and washed for an extended period of time, 17 hours, thus simulating practical plant conditions. In this case, peptization occurred in the course of washing, as was evidenced by the appearance of a cloudy filtrate.

The above washed samples of Part A and Part B were then carefully dried at a temperature of 85° C. and immediately calcined at a temperature of 400° C. under the most favorable conditions. A comparison of the two products showed that the product of Part A was a high-quality red pigment, whereas that of Part B was an unsatisfactory red pigment with a brown undertone. Furthermore, a material loss of several percent was incurred in the pigment product of Part B.

In addition to the above-demonstrated adverse effects obtained upon prolonged washing of the raw pigment, the material, whether washed according to Part A or B, is adversely effected if not calcined substantially immediately, that is, if it is washed and dried and then stored prior to calcination.

Part C

A sample of washed raw pigment, taken from Part A, weighing 0.1 lb. (dry basis), was carefully dried at a temperature of 85° C. and was then stored for 45 days. After this, the dried pigment was calcined as above and the product compared with that of Part A which had been immediately calcined after the short washing period. The calcined product derived from stored raw pigment was of inferior quality, possessing a strong brown undertone.

In contrast to the above-described experiments, the following examples, which are typical of the process of our invention, illustrate the solution to the problems associated with peptization and oxidation exhibited by the raw pigments described above.

EXAMPLE 2

In this example a strike was made employing the same procedure as in Example 1, except that the amounts of reactants employed were different. The amounts employed were as follows:

| | |
|---|---|
| Elemental mercury _____ lbs__ | 200 |
| Nitric acid solution (4.12 lbs. $HNO_3$/gal.) __gals__ | 116.5 |
| Water _____ gals__ | 58.5 |
| Sodium sulfide solution (0.298 lb. sulfide ion per gallon) _____ gals__ | 905 |
| Cadmium sulfate solution (1.17 lbs. Cd/gal.) gals__ | 614 |

A treatment was then applied to the finished strike slurry as follows:

One-half gallon of a solution containing 0.8 lb. $H_2SO_4$; nine gallons of a sodium silicate solution containing 3.0 lbs. of $SiO_2$ and 1.0 lb. of $Na_2O$; and eighteen gallons of a solution of sodium aluminate containing 6.0 lbs. of $Al_2O_3$ and 4.0 lbs. of $Na_2O$, were all added to the well-agitated slurry so that the final pH of the mixture was near neutrality.

The product was thereafter filtered and washed for approximately 36 hours, and then dried in the usual manner. No peptization of the precipitate was observed during the prolonged washing, nor was there any appreciable loss in the weight of the raw pigment. Upon calcination of the dried raw pigment, there was obtained a high-quality red pigment. Other calcinations were performed on retained portions of the dried raw pigment which had been stored for a week and longer, and in each instance there was obtained a high-grade red pigment showing little evidence of quality impairment. This demonstrates to our satisfaction that the treatment of the process of our invention provides a protective characteristic to a raw pigment which permits of prolonged washing and of storage prior to calcination.

The following example demonstrates that the treating reagents, sodium silicate and sodium aluminate, may be added in the strike solutions, as well as by the method of Example 2, to obtain all of the benefits of our invention.

EXAMPLE 3

A strike was made for a medium red pigment, wherein the expected yield of calcined pigment was approximately 1100 pounds. The amounts of chemicals used were:

| | |
|---|---|
| Elemental mercury _____ | 200 lbs. |
| Nitric acid solution (4.12 pounds $HNO_3$ per gallon) _____ | 116.5 gals. |
| Water _____ | 58.5 gals. |
| Sodium sulfide solution (0.298 pound sulfide ion per gallon) ____ | 833 gals. |
| Cadmium sulfate solution (1.17 pounds Cd per gallon) _____ | 570 gals. |
| Sodium silicate solution (3.08 pounds $SiO_2$, 1.0 pound $Na_2O$ per gallon) _____ | 0.89 gal. diluted to 9 gals. |
| Hydrated sodium aluminate (5.5 pounds $Al_2O_3$, 3.7 pounds $Na_2O$) _____ | 12.7 lbs. dissolved in 12 gals. water. |

The solution of mercury in the nitric acid, after dilution with water, was incorporated into the sodium sulfide solution. To the admixture was added, slowly, the sodium silicate solution followed by the sodium aluminate solution. The strike was then made by adding the resulting mixture to the cadmium sulfate solution.

Although the greencake derived from this strike was washed in a filter press for 49 hours, there was no peptization such as occurs in the absence of our treatment, and there was no appreciable loss of valuable material in the course of the washing step. Further, after drying in the usual manner, calcination of the raw pigment produced a high-quality red pigment. Likewise, portions of the same raw pigment, allowed to stand (or stored) for a week and more, were then successfully calcined to red pigments of high quality.

To show that our treatment with sodium silicate and sodium aluminate is effective in reconditioning washed greencake which has begun to peptize, the following example is presented.

EXAMPLE 4

By a procedure similar to that described in Example 1, a strike was made for a light red shade mercury-cadmium sulfide pigment. The main bulk of the resulting slurry was filtered in regular plant equipment, followed by washing—incomplete, but for a period of time which was long enough to bring about partial peptization. The wet greencake was then re-slurried in water to a volume of 880 gallons, which contained the equivalent of 800 pounds calcined pigment. While constantly agitating, the slurry was treated, first with 6.5 gallons sodium silicate solution containing the equivalent of 2.0 pounds $SiO_2$ and 0.65 pounds $Na_2O$, then with a total of 4.7 gallons sulfuric acid containing 6.9 pounds $H_2SO_4$ and a total of 8.9 gallons sodium aluminate solution containing the equivalent of 4.1 pounds $Al_2O_3$ and 2.7 pounds $Na_2O$.

The sodium sulfate formed as a result of the foregoing process was removed from the solids by thorough washing (15 hours) in regular plant equipment. There was no evidence of peptization at any stage in the washing operation, and upon drying and calcining the washed cake, a high-quality red pigment was produced.

EXAMPLE 5

A sample of original slurry from the strike of Example 4, weighing about 2½ lbs., was treated with sufficient sodium silicate solution and sodium aluminate solution to provide silica and alumina in amounts equal to 1% by weight and 2% by weight, respectively, of the calcined pigment. The pH of the mixture was kept in the range of 5.5–7.0 with dilute sulfuric acid solution. Filtration, washing (prolonged) until substantially free of sulfate (no peptization occurred), drying and calcining gave rise to a red pigment of high quality.

The preceding example illustrates the practical maximum treatment comprehended by our invention for the purposes of stabilizing the raw pigment against peptization during the washing step and against atmospheric oxidation during drying and storing prior to calcining. Correspondingly, the minimum effective treatment of our invention calls for amounts of silica and alumina of the order of 0.05% by weight and 0.1% by weight, respectively, of the calcined pigment.

While, further, sodium silicate alone or sodium aluminate alone is effective for stabilization purposes, maximum benefits are secured by using our combination of chemicals, as described in the examples of this invention.

Also, while we have described an improved process for preparing pure cadmium red pigments, our invention covers pigments of the extended type, more fully with reference to copending application Serial No. 674,315, filed July 26, 1957, mentioned above.

Having thus described our invention, it will be understood that modifications can be made that fall within the spirit thereof and scope of the appended claims.

We claim:

1. In a process for preparing a mercury-cadmium sulfide pigment, the improvement which comprises treating said pigment, prior to calcination thereof, with a minor proportion of a conditioning agent selected from the class consisting of hydrated silica, hydrated alumina, and mixtures of hydrated silica and hydrated alumina, said minor proportion based on the weight of resulting calcined pigment being at least about 0.05% for the hydrated silica expressed at $SiO_2$, at least about 0.1% for the hydrated alumina expressed as $Al_2O_3$, and at least 0.15% for mixtures of hydrated silica and hydrated alumina expressed as said anhydrous oxides of silicon and aluminum.

2. In a process for preparing a mercury-cadmium sulfide pigment in which a mercury-cadmium-sulfide precipitate is washed to remove soluble salts and then calcined, the improvement which comprises incorporating a small quantity by weight of a conditioning agent selected from the class consisting of hydrated silica, hydrated alumina, and mixtures of hydrated silica and hydrated alumina into said precipitate prior to the substantially complete removal of the soluble salts, said small quantity based on the weight of the resulting calcined pigment being about 0.05% to about 1% for the hydrated silica expressed as $SiO_2$, about 0.1% to about 2% for the hydrated alumina expressed as $Al_2O_3$, and about 0.15% to about 3% for mixtures of hydrated silica and hydrated alumina expressed as said anhydrous oxides of silicon and aluminum.

3. A process for producing a calcined red pigment which comprises preparing a mixture of a small quantity by weight of a treating agent selected from the class consisting of hydrated silica, hydrated alumina, and mixtures of hydrated silica and hydrated alumina, said small quantity based on the weight of the resulting calcined pigment being about 0.05% to about 1% for the hydrated silica expressed as $SiO_2$, about 0.1% to about 2% for the hydrated alumina expressed as $Al_2O_3$, and about 0.15% to about 3% for mixtures of hydrated silica and hydrated alumina expressed as said anhydrous oxides of silicon and aluminum, and a mercury-cadmium sulfide precipitate containing soluble salts, washing out the soluble salts from the mixture, and calcining the washed precipitate containing the treating agent.

4. The process of claim 3 in which the treating agent is present at the time the precipitate is formed.

5. The process of claim 3 in which the treating agent is added to an aqueous slurry of the precipitate.

6. A process which consists essentially of incorporating into a freshly formed precipitated mercury-cadmium sulfide contaminated with soluble salts, a small quantity of a freshly formed treating agent selected from the class consisting of hydrated silica, hydrated alumina, and mixtures of hydrated silica and hydrated alumina, said small quantity based on the weight of calcined pigment being about 0.05% to about 1% for the hydrated silica expressed as $SiO_2$, about 0.1% to about 2% for the hydrated alumina expressed as $Al_2O_3$, and about 0.15% to about 3% for mixtures of hydrated silica and hydrated alumina expressed as said anhydrous oxides of silicon and aluminum.

7. In a process for preparing a mercury-cadmium sulfide pigment composition which comprises admixing the solution of a mercury sulfide-forming material with a solution of a cadmium sulfide-forming material to obtain a co-precipitate of mercury-cadmium sulfide, and where said co-precipitate is washed to remove undesired soluble salts therefrom, the improvement which consists essentially of treating said composition prior to calcination thereof with compounds of silicon and aluminum capable of being precipitated as hydrated silica and hydrated alumina, the amounts by weight of the compounds of silicon and aluminum added to the composition being from about 0.05% to about 1% for the silicon compound expressed as $SiO_2$, and from about 0.1% to about 2% for the aluminum compound expressed as $Al_2O_3$, said percentages being based upon the weight of calcined pigment, and precipitating said compounds of silicon and aluminum as their hydrated oxides.

8. A stabilized composition of matter adaptable for preparing a pigment product, said composition consisting essentially of mercury-cadmium sulfide and a minor proportion by weight of a conditioning agent selected from the class consisting of hydrated silica, hydrated alumina, and mixtures of hydrated silica and hydrated alumina, said minor proportion based on the weight of calcined pigment being at least about 0.05% for the hydrated silica expressed as $SiO_2$, at least about 0.1% for the hydrated alumina expressed as $Al_2O_3$, and at least about 0.15% for mixtures of hydrated silica and hydrated alumina expressed as said anhydrous oxides of silicon and aluminum.

9. The stabilized composition of claim 8 wherein said proportion of hydrated silica expressed as $SiO_2$ is about 0.05% to about 1%, said proportion of hydrated alumina expressed as $Al_2O_3$, about 0.1% to about 2%, and said proportion of mixtures of hydrated silica and hydrated alumina expressed as said anhydrous oxides of silicon and aluminum is about 0.15% to about 3%.

References Cited in the file of this patent

UNITED STATES PATENTS

| | | |
|---|---|---|
| 1,959,748 | Svendson | May 22, 1934 |
| 2,878,134 | Gagliano et al. | Mar. 17, 1959 |